United States Patent [19]

Smith et al.

[11] 4,246,161
[45] Jan. 20, 1981

[54] CARBONYL LATENT ACCELERATORS FOR CURING EPOXY RESINS

[75] Inventors: James D. B. Smith, Wilkins Township, Allegheny County; Robert N. Kauffman, Monroeville, both of Pa.

[73] Assignee: Westinghouse Electric Corp., Pittsburgh, Pa.

[21] Appl. No.: 64,934

[22] Filed: Aug. 8, 1979

[51] Int. Cl.² .......................................... C08G 59/68
[52] U.S. Cl. .............................. 260/37 EP; 260/38; 310/43; 336/96; 525/509; 525/529; 528/92; 528/103; 528/112; 528/361; 528/365
[58] Field of Search ................ 528/92, 112, 361, 365, 528/103; 260/37 EP, 38; 525/507, 529

[56] References Cited

U.S. PATENT DOCUMENTS

| 3,709,861 | 1/1973 | Anderson | 260/47 EC |
| 4,137,275 | 1/1979 | Smith et al. | 260/830 TW |

Primary Examiner—Earl A. Nielsen
Attorney, Agent, or Firm—D. P. Cillo

[57] ABSTRACT

A highly fluid, solventless, resinous, impregnating and coating composition, suitable as a high voltage insulation for electrical members, is made from an admixture containing: 100 parts of an epoxy resin, about 25 to 200 parts of an acid anhydride reactive with the epoxy resin, and about 0.002 to 1.00 part of a selected metal carbonyl, acting as a latent accelerator.

10 Claims, 2 Drawing Figures

CARBONYL LATENT ACCELERATORS FOR CURING EPOXY RESINS

BACKGROUND OF THE INVENTION

To improve high temperature stability and to give better physical and electrical properties over amine cured epoxy resin systems, it has been the general practice in the epoxy technological field to use anhydride curing agents with epoxy resins, particularly for high voltage insulation applications. Most epoxy-anhydride formulations require elevated-temperature cures, and for most commercial applications it is necessary to add some material to speed the rate of cure. Consequently, a considerable amount of effort has been devoted in recent years to develop a perfect catalyst or accelerator for curing epoxy resins, especially those used for high voltage coil insulation, i.e., over about 7,000 volts. In high voltage coils, only an absolute minimum of voids can be tolerated in the resinous insulation. Therefore, the applied resin impregnating composition must be extremely fluid, solventless, and capable of a very fast gel, so that resin will not easily drain from a coil during curing.

The properties desired of such a catalyst or accelerator are: it should be inexpensive and readily available; it should gel the epoxy resin system, preferably at times below about 60 minutes at about 175° C.; it should be completely soluble with the epoxy resin-anhydride system at all temperatures; the initial viscosity of the catalyzed resin system should be below about 350 cps. at 25° C.; the preferred storage life of the catalyzed resin system should be over about 150 days at 25° C., i.e., the viscosity should remain below about 1,000 cps. during that period; it should not adversely affect the mechanical properties of the cured resin system; after cure, the resin system preferably should have power factor values of below about 15% at 150° C.

Several latent catalysts have appeared on the commercial scene in recent years. Among these are quaternary ammonium halides such as benzyltrimethylammonium chloride, stannous octoate, "extra-coordinate" siliconate salts, triethanolamine borate, triethanolamine titanate and various other metal chelates. However, these materials failed to meet all of the above described requirements and have been rejected.

Smith, in U.S. Pat. No. 4,137,275, taught the use of a selected metal acetylacetonate, as a latent catalyst for a solventless, highly fluid, resinous epoxy-anhydride impregnating composition. The Smith materials provided most of the above mentioned desired properties. However, while the selected acetylacetonate, such as chromium or manganese acetylacetonate, combined superior gel times with good electrical properties, these latent catalysts had storage stabilities of from 160 to 200 days at 25° C. While these pot life values are extremely good, even better storage stability is desirable for commercial applications.

SUMMARY OF THE INVENTION

It has been discovered that selected metal carbonyls will behave as latent accelerators for epoxy resins, when used in certain weight proportions with an acid anhydride reactive with the epoxy resin. The effective weight ratio of epoxy resin:acid anhydride:metal carbonyl is 100:25 to 200:0.002 to 1.00. Preferably the resin will consist of a low viscosity epoxy:high viscosity epoxy mixture having a weight ratio of from about 1.0:0.0 to about 1.0:4.0. This combination of materials provides an impregnating and casting composition having an initial viscosity of up to about 350 cps. at 25° C. The useful metal carbonyls are selected from the group consisting of chromium hexacarbonyl, which is the preferred material, dicobalt octacarbonyl, and mixtures thereof.

Excellent storage properties at ambient temperatures have been found, i.e., storage lifetimes of at least 150 days up to 1,000 cps. at 25° C., consequently, extremely long life resin formulations employing these latent accelerators are possible. Electrical measurements on the cured system show very low dielectric constants and power factor values, even at temperatures up to 150° C. The epoxy-anhydride compositions utilizing these selected metal carbonyls are particularly useful as compositions which can be applied to and easily impregnate electrical coil windings used in insulated high voltage electrical motors and generators, particularly those having mica wrapped ground walls and multiple layers of mica insulation. It is also a useful potting or casting compound for electrical coil windings disposed about a magnetic core of a high voltage transformer.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
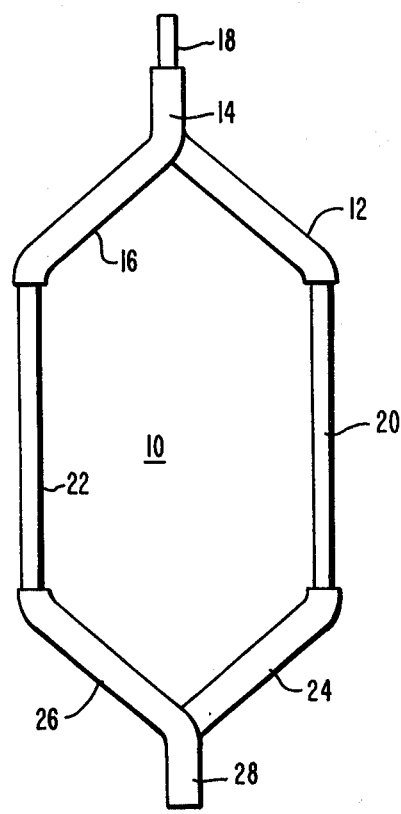
FIG. 1 is a plan view of a closed full electrical coil member having two slot portions.

It has been found that selected metal carbonyls are particularly effective and outstanding latent accelerators for the anhydride cure of epoxy coating compositions used in impregnating and encapsulating the coils of high voltage capability electrical devices. At concentrations of about 0.002 to 1.00 part latent accelerator per 100 parts epoxy resin, rapid gel times in the temperature range of 125° C. to 175° C. are possible. The term "latent accelerator" is taken to mean the ability of certain selected metal carbonyls to speed up curing rates of epoxy-anhydride systems at elevated temperatures (e.g. over 100° C.) while exhibiting little or no cure at room temperature, thus giving good storage properties.

The useful metal carbonyls of the present invention can be characterized by the following structural formulas:

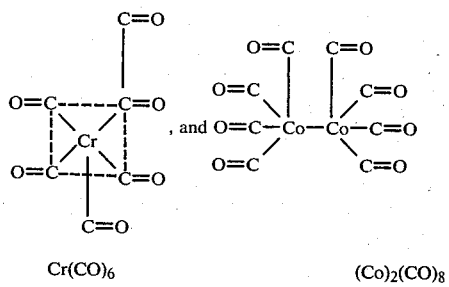

Cr(CO)₆                          (Co)₂(CO)₈

The dotted lines for the chromium compound are meant to indicate that 4 carbons are on one plane with the other two carbons disposed approximately 90° to that plane above and below it. In both of these compounds, as distinguished from acetylacetonates, the carbons are directly bonded to the metal atom. These selected carbonyls can be used alone or in mixtures.

A number of metal carbonyls are not particularly useful in epoxy-anhydride systems, providing either long gel times, or very poor storage stability. Included among these materials are manganese carbonyl and a variety of iron carbonyl compounds. At this time it is not clear why only certain of the metal carbonyls are such effective latent accelerators for epoxy-anhydride impregnating systems. It is believed that the cure mechanism may involve a complex or adduct formation between the epoxy-anhydride and the metal carbonyl, or actual decomposition of the metal carbonyl to reactive initiation species.

The useful, selected metal carbonyls must be mixed in critical proportions with the epoxy-anhydride system. The useful weight percent range of ingredients, to provide a good compromise of fluidity, cure time, storage life and electrical and mechanical properties is an epoxy:anhydride:selected metal carbonyl weight ratio of 100:25 to 200:0.002 to 1.00, with a preferred weight ratio of 100:75 to 150:0.01 to 0.50. Over 1.00 part of selected metal carbonyl per 100 parts of epoxy causes loss of fluidity and reduction of pot life; under 0.002 part of selected metal carbonyl causes excessively long gel times for high voltage coil applications.

One type of epoxy resin, which may be used in the invention, is obtainable by reacting epichlorohydrin with a dihydric phenol in an alkaline medium at about 50° C., using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the chemical structural formula:

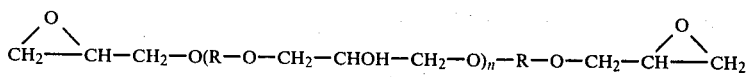

where n is an integer of the series 0, 1, 2, 3 . . . , and R represents the divalent hydrocarbon radical of the dihydric phenol. Typically R is:

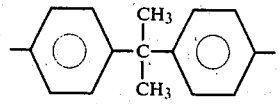

to provide a diglycidyl ether of bisphenol A type epoxy resin or

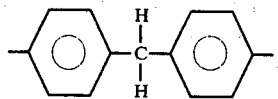

to provide a diglycidyl ether of bisphenol F type epoxy resin.

The bisphenol epoxy resins used in the invention have a 1, 2 epoxy equivalency greater than one. They will generally be diepoxides. By the epoxy equivalency, reference is made to the average number of 1, 2 epoxy groups,

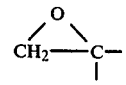

contained in the average molecule of the glycidylether.

Other glycidylether resins that are useful in this invention include polyglycidylethers of a novolac. The polyglycidylethers of a novolac suitable for use in accordance with this invention are prepared by reacting an epihalohydrin with phenol formaldehyde condensates. While the bisphenol-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of epoxy novolac resins.

Other useful epoxy resins include glycidyl esters, hydantoin epoxy resins, cycloaliphatic epoxy resins and diglycidyl ethers of aliphatic diols. The glycidyl ester epoxy resins which can be employed in this invention are non-glycidyl ether epoxy resins containing more than one 1,2 epoxy group per molecule. They are characterized by substitution of the ester bond,

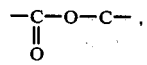

for the ether bond, —O—, and have the chemical structural formula:

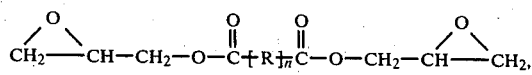

where R is an organic radical substituent selected from the group consisting of R', R'—O—R', R'—COO—R' and mixtures thereof, where R' is selected from the group consisting of alkylene groups, having from about 1-8 carbon atoms, saturated cycloalkylene groups where the ring has 4 to 7 carbons and mixtures thereof, where n is from about 1-8.

The hydantoin epoxy resins which can be employed in this invention are based on hydantoin, a nitrogen-containing heterocyclic ring compound having the structure:

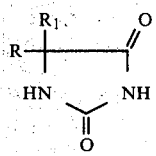

A wide variety of compounds can be formed by reacting the nitrogen positions in the five membered hydantoin ring. The hydantoin ring is readily synthesized from ketones, hydrogen, cyanide, ammonia, carbon dioxide and water. The epoxy resins are formed through reaction of the hydantoin with epichlorohydrin. Hydantoin rings can be linked together for form extended resins analogous in structure to bisphenol A. Polyfunctional resins can also be formed from these chain-extended materials by glycidylization of the hydroxyls and the remaining nitrogens. These heterocyclic glycidyl amine epoxy resins can be represented by the structural formula:

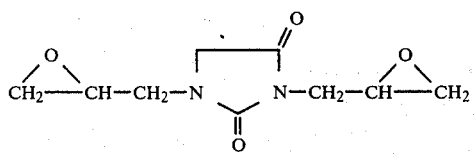

The cycloaliphatic type epoxy resins employed as the resin ingredient in the invention are selected from nonglycidyl ether epoxy resins containing more than one 1,2 epoxy group per molecule. These are generally prepared by epoxidizing unsaturated aromatic hydrocarbon compounds, such as cyclo-olefins, using hydrogen peroxide or peracids such as peracetic acid and perbenzoic acid. The organic peracids are generally prepared by reacting hydrogen peroxide with either carboxylic acids, acid chlorides or ketones to give the compound R—COOOH.

Examples of cycloaliphatic epoxy resins would include: 3,4-epoxycyclohexylmethyl-3,4-epoxycyclohexane carboxylate (containing two epoxide groups which are part of ring structures, and an ester linkage); vinyl cyclohexene dioxide (containing two epoxide groups, one of which is part of a ring structure); 3,4-epoxy-6-methylcyclohexyl methyl-3,4-epoxy-6-methylcyclohexane carboxylate and dicyclopentadiene.

Other useful epoxy resins include diglycidyl ethers of an aliphatic diol having from 2 to 12 carbon atoms. These are low viscosity epoxy resins, usually monomers. Included are diglycidyl ethers of a glycol having from 2 to 12 carbon atoms between the glycidyl ether units, i.e., 2 to 12 carbons in the glycol unit, for example, diglycidyl ether of neopentyl glycol (DGENPG), diglycidyl ethers of 1,4 butane diol, diglycidyl ethers of ethylene glycol, and diglycidyl ethers of polyether glycols, such as, for example, diglycidyl ethers of triethylene glycol and diglycidyl ethers of tetraethylene glycol and their mixtures.

DGENPG is the preferred epoxy resin of this type. DGENPG is prepared by a two step process. The initial step reacts neopentyl glycol and epicholorohydrin in the presence of $BF_3$ to produce a chlorohydrid intermediate which is then dehydrohalogenated by sodium hydroxide or sodium aluminate to provide:

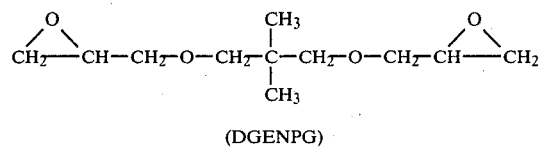

(DGENPG)

The use of diglycidyl ethers of an aliphatic diol as the only epoxy resin component can provide resinous compositions having only about 15 cps. to 30 cps. initial viscosities at 25° C. They are extremely useful for very high voltage applications, i.e., about 20,000 to 30,000 volts, where thick multiple layers of mica insulation must be impregnated.

It is preferred to use some of these diglycidyl ethers of aliphatic diols in combination with the other epoxy resins, because the aliphatic diol epoxides are all low viscosity materials, generally between about 5 cps. to 60 cps. at 25° C., and help to reduce the viscosity of the resin impregnation composition. The epoxy resin system can consist of: (A) a first epoxy resin having a low viscosity (between about 5 to about 60 cps. at 25° C.) i.e., diglycidyl ethers of aliphatic diols and (B) another or second epoxy resin that has a high viscosity (above about 250 cps. and generally between about 250 cps. to about 20,000 cps. at 25° C.) i.e., bisphenol A, bisphenol F, novolacs, glycidyl esters, hydantoins, cycloaliphatics and their mixtures; in the weight ratio of diglycidyl ether of an aliphatic diol low viscosity epoxy resin:-second epoxy resin having a high viscosity of from about 1.0:0.0 to about 1.0:4.0. The preferred range for most applications will be a range of low viscosity epoxy resin:high viscosity epoxy resin of from about 1.0:0.75 to about 1.0:1.25.

All of these epoxy resins can be characterized by reference to their epoxy equivalent weight, which is defined as the mean molecular weight of the particular resin divided by the mean number of epoxy radicals per molecule. In the present invention, all of the suitable epoxy resins will have a preferred epoxy equivalent weight of from about 100 to about 500 with a most preferred range of about 150 to about 250. All of these epoxy resins are well known and commercially available. Further reference can be made to Lee and Neville, *Handbook Of Epoxy Resins*, McGraw-Hill, 1967, Ch 2-10 to 2-27 and to U.S. Pat. No. 4,137,275, both herein incorporated by reference, for further details of their structure and manufacture. In addition, the term "epoxy composition" is also meant to include pre-reacted epoxy resin-maleic anhydride prepolymers, as described in U.S. Pat. No. 4,173,593, herein incorporated by reference. These prepolymers comprise epoxy diesters formed from epoxy resin, maleic anhydride, and a catalyst such as piperidine or an aliphatic tertiary amine, reacted to an acid number of between 0.5 and 3.0, in an essentially complete esterification reaction.

The organic, carboxylic acid anhydrides reactive with the epoxy, which are to be used in carrying out the invention, include the conventional organic mono- and poly-functional anhydrides. Typical of the mono-functional anhydrides are hexahydrophthalic anhydride, 1-methylhexahydrophthalic anhydride, tetrahydrophthalic anhydride, 1-methyltetrahydrophthalic anhydride, phthalic anhydride, NADIC anhydride, NADIC methylanhydride, dodecenyl succinic anhydride, maleic anhydride and the like. Poly-functional anhydrides which may be employed include pyromellitic dianhydride, polyazelaic polyanhydride, the reaction product of trimellitic anhydride and a glycol, and benzophenone tetracarboxylic acid dianhydride. These organic anhydrides may be used singly or in admixture. The total anhydride content of the epoxy-anhydride mixture must lie within the range of from about 0.5 to about 1.5 anhydride equivalents for each epoxy equivalent.

For a number of special purposes unmodified epoxy resins may be considered to have certain disadvantages. These disadvantages may include high cost and too great a rigidity for specific applications. The epoxy resins may be modified by incorporation of epoxide diluents, flexibilizers and fillers. Effective amounts of a reactive epoxy diluent may be employed, generally between about 10 parts to 25 parts per 100 parts of the epoxy resins enumerated above, to further help reduce the viscosity of the mixed system. Diluents such as, for example, phenyl glycidyl ether, butylglycidyl ether, alkyl glycidyl ether, vinyl cyclohexanone dioxide, endo-dicyclopentadione dioxide, octylene oxide and their mixtures, can be used.

Liquid, monoethylenically unsaturated vinyl monomers can also be used to reduce viscosity of the impregnating resin system. These materials are free of functional reactive groups reactive with epoxy resins. When the vinyl monomers are used, a co-reactive epoxy resin prepolymer, herein described, must also be used, so that the vinyl monomer is effectively cross-linked. Examples of useful vinyl monomers include styrene, t-butyl styrene, vinyl toluene, methyl methacrylate, methyl vinyl ketone and the like, and their mixtures. They can be added in amounts up to 300 parts, preferably between 50 and 250 parts, per 100 parts of epoxy resin, in the prepolymer. This combination of materials can provide impregnating varnishes having viscosities of between 1 and 25 cps. at 25° C.

Epoxidized natural oil extenders, such as epoxidized linseed or soy bean oils, octyl epoxy tallate and reactive plasticizers such as the conventional phthalates and phosphates may also be used in small amounts, up to about 40 parts per 100 parts of epoxy resin to provide increased flexibility. Thixotropic agents, such as $SiO_2$ and asbestos in gel composition, and pigments such as $TiO_2$ may be used as aids in fluidizing the composition or enhancing the color tones of the cured resins. Similarly, various inorganic particulate fillers, such as silica, quartz, beryllium aluminum silicate, lithium aluminum silicate and mixtures thereof, in average particle sizes of from about 10 to 300 microns, may be employed in amounts up to about 100 parts per 100 parts of epoxy resin, to improve electrical properties of the resin formulation.

A closed full coil 10, prepared in accordance with the present invention, for insertion into an insulated high voltage electrical machine, such as an insulated high voltage electric motor or generator, is illustrated in FIG. 1. The full coil would be disposed within the slots of the stator surrounding the metal motor armature or generator rotor. The full coil comprises an end portion comprising a tangent 12, a connecting loop 14 and another tangent 16 with bare leads 18 extending therefrom. Slot portions 20 and 22 of the coil which sometimes are hot pressed to precure the resin and to form them to predetermined shape and size are connected to the tangents 12 and 16, respectively. These slot portions are connected to other tangents 24 and 26 connected through another loop 28. In general, generator coils are impregnated and then hot pressed prior to winding; motor coils are generally post impregnated "in situ".

The coils are placed the slots of the stator of an electrical machine and the end windings wrapped and tied together. The uninsulated leads are then soldered, welded or otherwise connected to each other or to the commutator. In the case of a motor, generally the entire motor containing the coils will be placed in an impregnating bath containing the impregnating resin of this invention and vacuum impregnated. Thereafter the impregnated motor is removed from the impregnating tank, drained, placed in an oven and heated to a temperature to cure the completely reactive composition in the coils.

Figure 2:
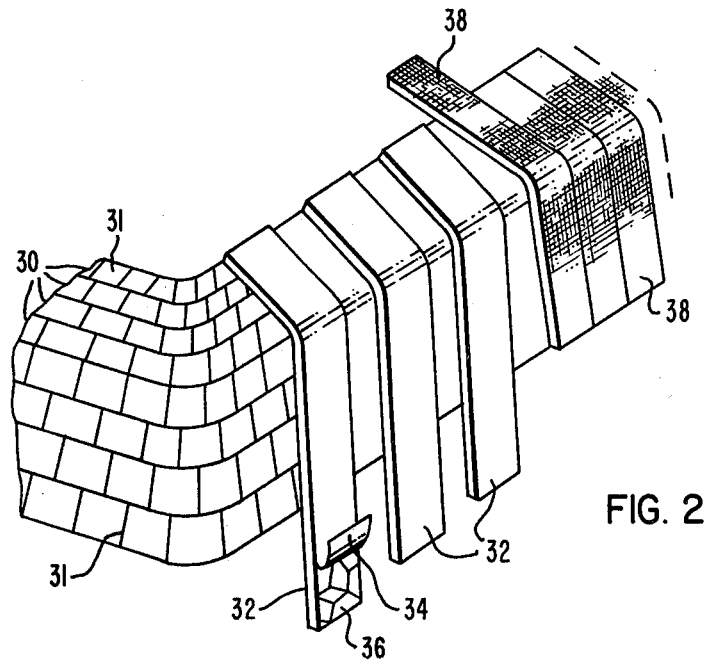
FIG. 2 is a fragmentary view in perspective, showing part of a high voltage coil comprising a plurality of turns of conductors wound with twin insulation and bound together with mica tape as ground insulation, covered with a porous bonding tape.

In a high voltage A.C. motor or generator, the coil member may comprise a plurality of turns of round or rectangular metallic, electrical conductors, each turn of the conductor consisting essentially of a copper or aluminum strap 30 wrapped with turn insulation 31, as shown in FIG. 2. The turn insulation 31 would be disposed between the conductor straps 30 and the mica tape 32, and would generally be prepared from a fibrous sheet or strip impregnated with a resinous insulation.

While the turn insulation may consist solely of a coating of uncured varnish or resin, it can also comprise a wrapping of fibrous material treated with a cured resin. Glass fiber cloth, asbestos paper or mica paper treated with a cured resin may be used with equally satisfactory results. The resin applied to the turn insulations may be a phenolic resin, an alkyd resin, a melamine resin or the like.

The turn insulation is generally not adequate to withstand the severe voltage gradients that will be present between the conductor and ground when the coil is installed in a high voltage A.C. motor or generator. Therefore, ground insulation for the coil is provided by mica tape 32, which binds the entire coil of electrical conductors together. Preferably, a plurality of layers of composite mica tape 32, which may comprise mica flakes 36 bound to a flexible material 34, are wrapped about the coil to bind the electrical conductors together, with sixteen or more layers being used for high voltage coils of generators. A bonding tape 38, which is porous may be wound around the mica tape bound coil. The bonding tape may comprise a porous, open weave substrate of natural or synthetic fabric cloth, for example, cotton, polyethylene or polyethylene terephthalate, coated with a phenolic type resin.

The highly fluid resin of this invention is used to impregnate and coat the bonding tape and mica tape shown. The highly fluid resin of this invention may also be used to coat and completely impregnate a transformer having a magnetic core and electrical windings disposed about the core.

EXAMPLE 1

Seven resin formulations were made containing 50 grams of a liquid diglycidyl ether of bisphenol A epoxy resin, having an epoxy equivalent weight of 172 to 176 and a viscosity at 25° C. of 4,000 to 5,550 cps. (sold commercially by Dow Chemical Co. under the tradename DER-332), 50 grams of neopentyl diglycidyl ether epoxy resin (diglycidyl ether of neopentyl glycol) having an epoxy equivalent weight of 130 to 165 and a viscosity at 25° C. of 6 to 8 cps. (sold commercially by Ciba Geigy Co.), 105 grams of 1-methyltetrahydrophthalic anhydride and 0.10 gram each of: (a) chromium hexacarbonyl, (b) dicobalt octacarbonyl, (c) dimanganese decacarbonyl, (d) iron pentacarbonyl, (e) iron-Bis(dicarbonylcyclopentadienyl) and (f) iron-Bis(cyclopentadienyl), a non-carbonyl compound, (to provide an epoxy resin:acid anhydride:metal compound weight ratio of 100:105:0.10). A control sample (g) not containing any latent accelerator was also prepared.

The components were poured into a container, stirred at room temperature and then put in a mixer for about five minutes. The initial viscosity of all the samples were about 60 cps. at 25° C. After about four hours, twenty gram samples were poured into flat 2" diameter aluminum dishes covered with a clock glass. These samples were placed in 150° C. and 175° C. forced air ovens. Each sample was inspected every 10 to 20 minutes to record the gel time. The approximate gel time was considered to be the amount of time it took the formulation to start to solidify.

Storage properties of the formulation were found by measuring viscosities at 25° C. in Gardner-Holdt bubble tube viscometers (ASTM designation D154-56). Measurements were usually taken at one-week intervals. The termination of the storage lifetime (pot-life) of these formulations was considered to be when the viscosity reached a value of 1,000 cps. at 25° C. Over about 1,000 cps. it would be difficult to completely impregnate high voltage coils.

To evaluate the effect of the accelerators on the electrical properties of the cured resin, 2" diameter×⅛" to ¼" thick castings of samples (a) and (b) were cured in an oven. A heating cycle of 16 hours at 150° C., with an additional 16 hours at 150° C. for sample (1), and 16 hours at 135° C., with an additional 16 hours at 150° C. for sample (b) was used. Then, 60 Hz power factors (100×tan δ) and dielectric constant values ε' were obtained at 150° C. (ASTM designation D150-65T). The results of these tests are recorded in Table 1 below:

but in combination with iron also drastically reduce pot life.

Only a select combination of metals are effective with carbonyl to give desirable latent catalytic effects to epoxy compositions. As shown, manganese decacarbonyl while having good storage stability proved to have overly long gel times-almost three times longer than the manganese acetylacetonate used as a latent catalyst in U.S. Pat. No. 4,137,275. The reason why only certain combinations of metal and carbonyl are useful as latent catalysts is not completely known at this time. Since either the gel times or pot lives of samples (c) through (g) were not commercially useful, the electrical properties of these samples were not evaluated.

Other epoxy resins could be substituted for those used in the samples, for example novolacs, hydantoins, glycidyl esters, cycloaliphatics or epoxy resin-maleic anhydride prepolymers. These last mentioned prepolymers can be made by reacting, for example, 1 part of a mixture of solid epoxy and liquid epoxy, in a weight ration of solid:liquid of 1:1 to 1:10, with 0.01 to 0.06 part of maleic anhydride in the presence of a catalyst, such as pyridine; to form an epoxy diester with an acid number of between about 0.5 to 3.0. This amount of diester can then have 0.05 to 3 parts of vinyl monomer, 0.3 to 1.2 parts of polycarboxylic anhydride and effective amounts of latent catalyst added thereto, to form a resinous impregnating composition.

Similarly, a wide variety of other anhydrides, such as phthalic anhydride, 1-methylhexahydrophthalic anhydride, dodecenyl succinic anhydride, poly azelaic polyanhydride and the like, can be substituted for the anhydride used in the samples.

We claim:

1. A highly fluid, solventless, resinous epoxy composition comprising; (1) an epoxy resin, (2) an anhydride reactive with the epoxy resin and (3) from about 0.002 part to 1.00 part per 100 parts by weight of epoxy resin of a metal carbonyl selected from the group consisting of chromium hexacarbonyl, dicobalt octacarbonyl and

TABLE 1

| Compound | Gel Time (min.) 150° | Gel Time (min.) 175° C. | Storage Stability (days) 25° C. | Thickness (in) | Electrical Properties 150° C. 100 tan δ | ε |
|---|---|---|---|---|---|---|
| (a) chromium hexacarbonyl | 35 | 15 | 250 | 0.272 | 3.5 | 7.5 |
| (b) dicobalt octacarbonyl | 110 | 55 | 200 | 0.262 | 1.8 | 7.3 |
| *(c) dimanganese decacarbonyl | 190 | 130 | 150+ | — | — | — |
| *(d) iron pentacarbonyl | 70 | 35 | 7 | — | — | — |
| *(e) iron Bis (dicarbonyl-cyclopentadienyl) | 70 | 45 | 10 | — | — | — |
| *(f) iron Bis (cyclopentadienyl) | 190 | 130 | 150+ | — | — | — |
| *(g) control | 320 | 215 | 500 | — | — | — |

*comparative examples

As can be seen, chromium hexacarbonyl and dicobalt octacarbonyl, samples (a) and (b), the latent catalysts of this invention, provide not only outstanding, low gel times, but also long storage stability, in combination with outstanding electrical properties. The iron carbonyl compounds (d) and (e), while providing outstanding gel times, were only stable for 7 to 10 days. Comparison of compound (e) with (f), a non-carbonyl material, shows that the carbonyl radicals can improve gel time mixtures thereof, acting as a latent catalyst.

2. A highly fluid, solventless, resinous epoxy composition comprising by weight:
(A) 100 parts by weight of a resin comprising:
(1) a first epoxy resin consisting of a diglycidyl ether of an aliphatic diol; and
(2) a second epoxy resin selected from the group consisting of bisphenol A epoxy resins, bisphenol F epoxy resins, novolac epoxy resins, glycidyl ester epoxy resins, hydantoin epoxy resins, cycloaliphatic epoxy resins and mixtures thereof, wherein the weight ratio of diglycidyl ether of an aliphatic diol; second epoxy resin is from about 1.0:0.0 to about 1.0:4.0, (B) about 25 parts to 200 parts by weight of an organic carboxylic acid anhydride, and (C) about 0.002 part to 1.00 part of a metal carbonyl selected from the group consisting of chromium hexacarbonyl, dicobalt octacarbonyl and mixtures thereof, acting as a latent catalyst, wherein the resinous composition has an initial viscosity of below about 350 cps. at 25° C.

3. The composition of claim 2, wherein the resin has an epoxy equivalent weight of from about 100 to about 500.

4. The composition of claim 2, wherein the composition has a storage lifetime of at least 150 days under 1,000 cps. at 25° C.

5. The composition of claim 2, wherein the metal carbonyl is chromium hexacarbonyl.

6. The composition of claim 2, wherein the diglycidyl ether of an aliphatic diol has a viscosity of between about 5 cps. to about 60 cps. at 25° C. and the second epoxy resin has a viscosity of between about 250 cps. to about 20,000 cps. at 25° C.

7. The composition of claim 2, wherein the diglycidyl ether of an aliphatic diol is selected from the group consisting of diglycidyl ethers of neopentyl glycol, diglycidyl ethers of 1,4 butane diol, diglycidyl ethers of ethylene glycol, diglycidyl ethers of polyether glycols and mixtures thereof.

8. The composition of claim 2, also containing up to 300 parts of monoethylenically unsaturated vinyl monomer per 100 parts epoxy resin.

9. The composition of claim 2, wherein the composition also contains up to about 100 parts of filler particles, of average particle sizes of from about 10 microns to about 300 microns.

10. An insulated electrical member and a cured body of resinous insulation applied to the member, the insulation comprising the cured resinous composition of claim 1.

* * * * *